(12) United States Patent
Apro

(10) Patent No.: US 10,509,181 B2
(45) Date of Patent: Dec. 17, 2019

(54) LOCKING IN-PLACE SMALL FORM FACTOR PLUGGABLE TRANSCEIVER MODULE

(71) Applicant: SIEMENS CANADA LIMITED, Oakville (CA)

(72) Inventor: Attila Apro, Barrie (CA)

(73) Assignee: Siemens Canada Limited, Ontario (CA)

( * ) Notice: Subject to any disclaimer, the term of this patent is extended or adjusted under 35 U.S.C. 154(b) by 0 days.

(21) Appl. No.: 16/072,113

(22) PCT Filed: Jan. 25, 2016

(86) PCT No.: PCT/US2016/014661
§ 371 (c)(1),
(2) Date: Jul. 23, 2018

(87) PCT Pub. No.: WO2017/131605
PCT Pub. Date: Aug. 3, 2017

(65) Prior Publication Data
US 2019/0033536 A1    Jan. 31, 2019

(51) Int. Cl.
*G02B 6/38* (2006.01)
*G02B 6/42* (2006.01)
(Continued)

(52) U.S. Cl.
CPC ......... *G02B 6/3897* (2013.01); *G02B 6/3879* (2013.01); *G02B 6/4246* (2013.01);
(Continued)

(58) Field of Classification Search
CPC .. G02B 6/3879; G02B 6/3893; G02B 6/3897; G02B 6/4246; G02B 6/4292; H04B 10/2581; H04B 10/40
(Continued)

(56) References Cited

U.S. PATENT DOCUMENTS

| 6,149,315 | A | 11/2000 | Stephenson |
| 6,881,095 | B2 * | 4/2005 | Murr ................. H01R 13/6275 |
| | | | 439/607.2 |
| 7,195,404 | B1 * | 3/2007 | Dudley ............... G02B 6/4201 |
| | | | 385/92 |

(Continued)

FOREIGN PATENT DOCUMENTS

| CN | 201060288 Y | 5/2008 |
| CN | 104345401 A | 2/2015 |

(Continued)

OTHER PUBLICATIONS

PCT International Search Report and Written Opinion of International Searching Authority dated Oct. 27, 2016 corresponding to PCT International Application No. PCT/US2016/014661 filed Jan. 25, 2016.

*Primary Examiner* — Amritbir K Sandhu

(57) ABSTRACT

A small form factor pluggable (SFP) optical transceiver module is provided. It includes a shell assembly that encloses an optical fiber connector configured to connect to a SFP optical transceiver and a retaining mount that is configured to be attached to a body portion of a device housing of a network device. The SFP optical transceiver is configured to interface a network device motherboard to a fiber optic at a given port of the network device. The shell assembly is configured to removably latch onto the retaining mount. The shell assembly includes a base and a body coupled to each other. The body has a latch to securely attach the optical fiber connector and the SFP optical transceiver to the retaining mount while allowing the SFP optical transceiver to be swapped as needed to reconfigure the given port of the network device.

18 Claims, 7 Drawing Sheets

(51) Int. Cl.
*H04B 10/2581* (2013.01)
*H04B 10/40* (2013.01)

(52) U.S. Cl.
CPC ....... *G02B 6/4292* (2013.01); *H04B 10/2581* (2013.01); *H04B 10/40* (2013.01)

(58) Field of Classification Search
USPC .................................................. 398/135–139
See application file for complete search history.

(56) References Cited

U.S. PATENT DOCUMENTS

| | | | | |
|---|---|---|---|---|
| 8,070,367 | B2* | 12/2011 | Winberg | G02B 6/3846 385/81 |
| 8,641,429 | B2* | 2/2014 | Fish | H01R 13/6658 439/76.1 |
| 10,120,140 | B2* | 11/2018 | Goldstein | G02B 6/3879 |
| 2001/0030855 | A1* | 10/2001 | Green | G02B 6/4277 361/754 |
| 2002/0009905 | A1 | 1/2002 | Poplawski et al. | |
| 2002/0093796 | A1* | 7/2002 | Medina | G02B 6/4201 361/728 |
| 2003/0063865 | A1* | 4/2003 | Holmquist | G02B 6/3807 385/75 |
| 2005/0047731 | A1* | 3/2005 | Hu | G01B 11/272 385/92 |
| 2007/0036489 | A1* | 2/2007 | Grzegorzewska | H01R 13/508 385/88 |
| 2007/0237466 | A1* | 10/2007 | Togami | G02B 6/4219 385/92 |
| 2012/0071019 | A1 | 3/2012 | Takamatsu | |
| 2014/0223587 | A1* | 8/2014 | Chen | G06F 21/88 726/35 |
| 2015/0201528 | A1* | 7/2015 | Lebo | G02B 6/4269 361/703 |

FOREIGN PATENT DOCUMENTS

| | | |
|---|---|---|
| RU | 2311738 C1 | 11/2007 |
| WO | 2014179376 A2 | 11/2014 |

* cited by examiner

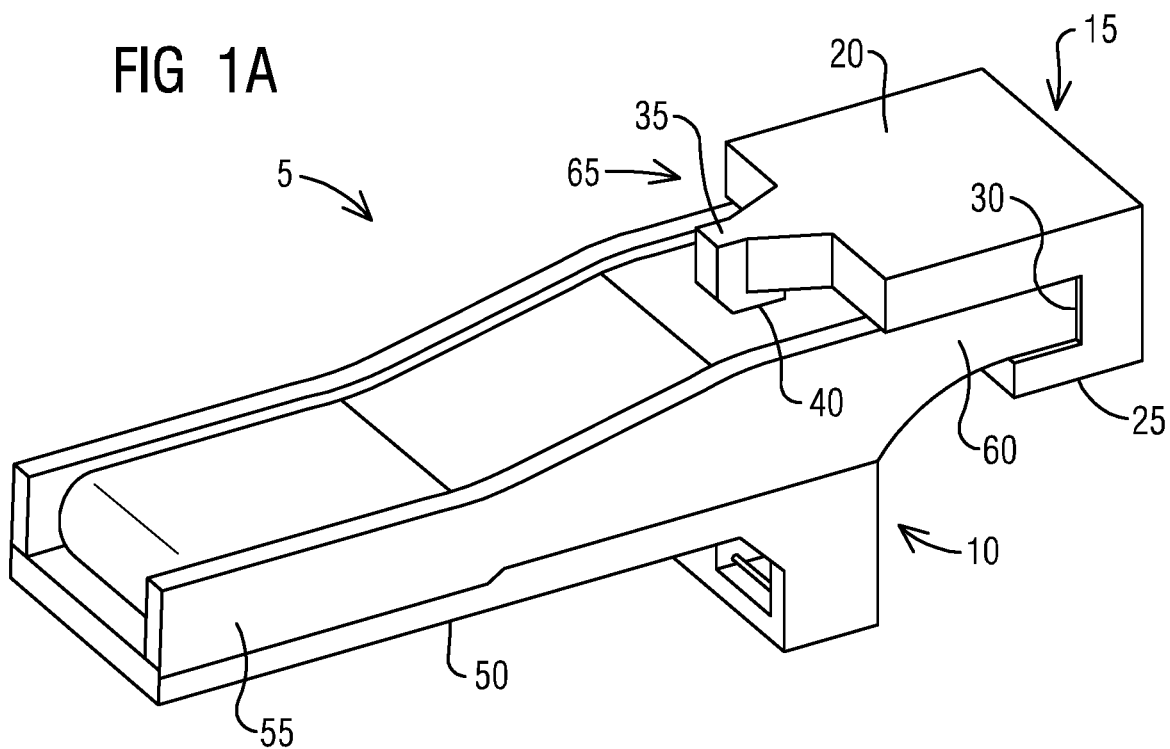
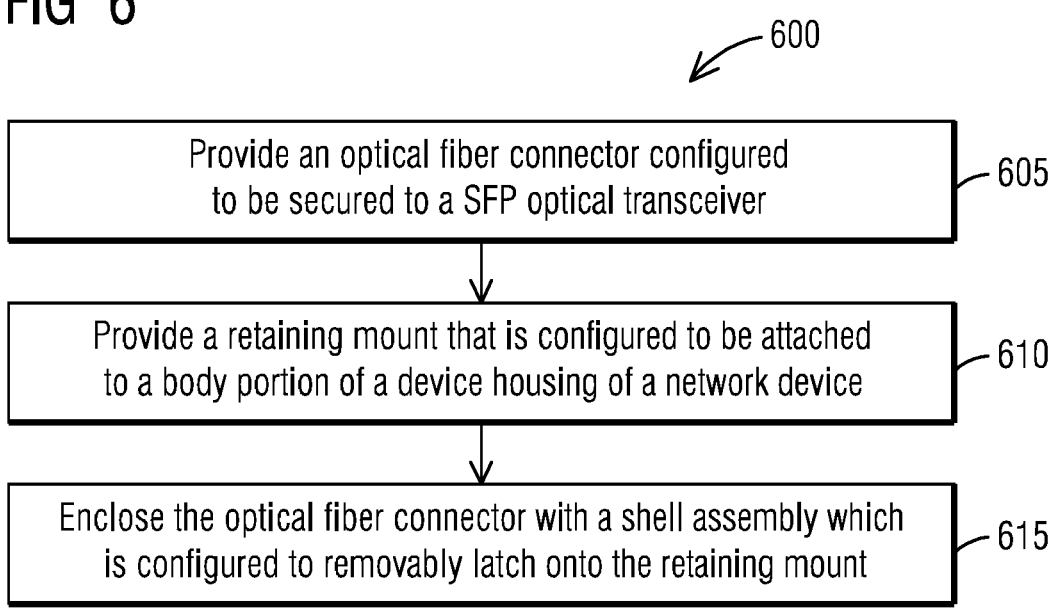

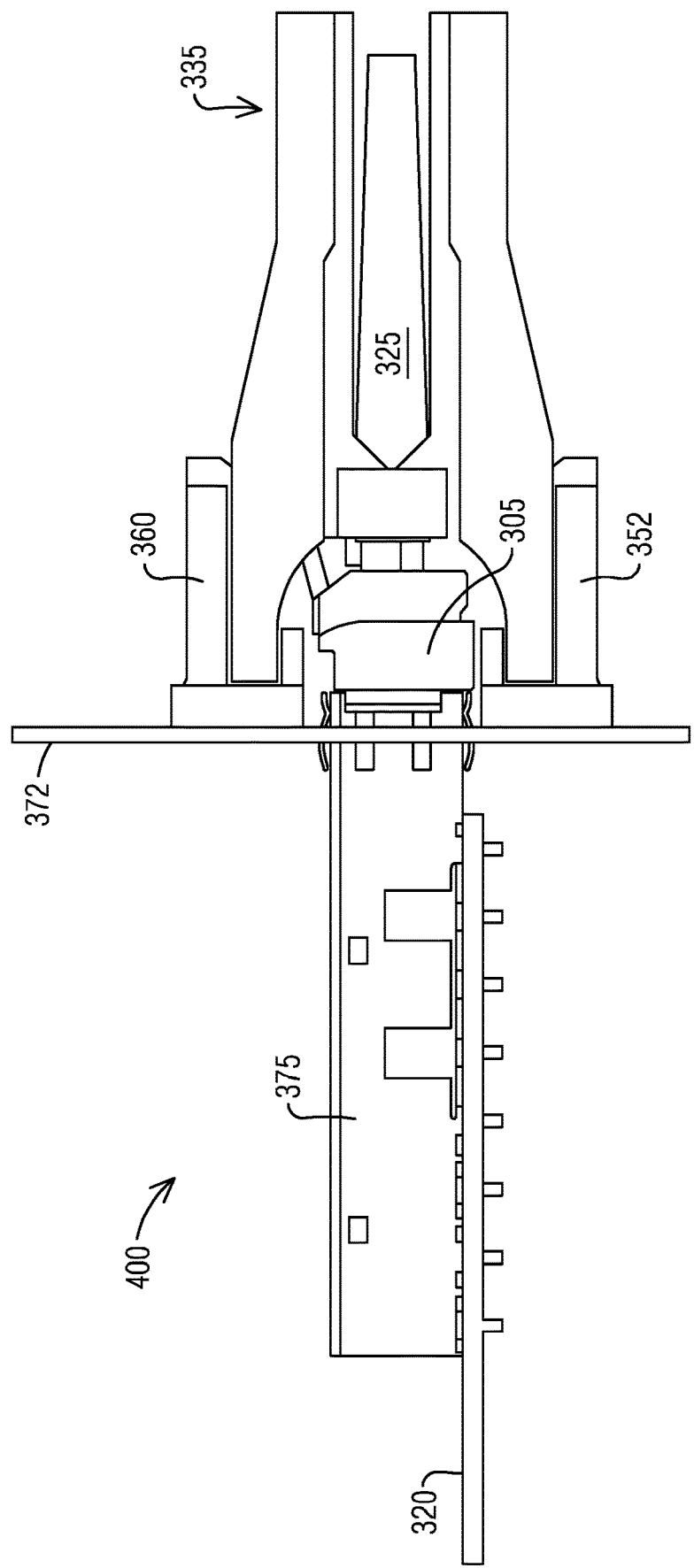

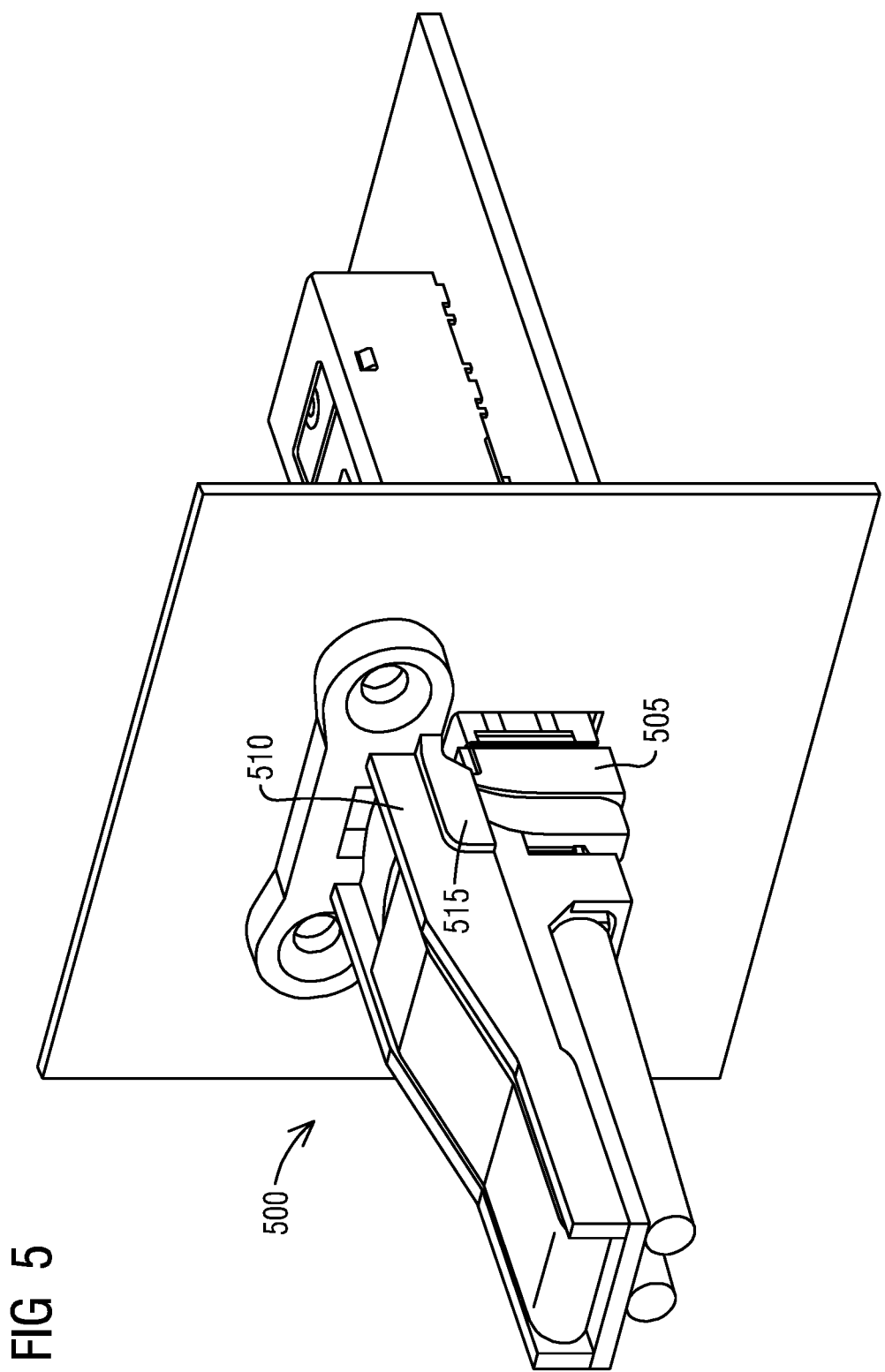

LOCKING IN-PLACE SMALL FORM FACTOR PLUGGABLE TRANSCEIVER MODULE

BACKGROUND

1. Field

Aspects of the present invention generally relate to providing communications such as via a small form factor pluggable (SFP) transceiver and more specifically relates to retaining SFP transceivers in place when they are mounted onto a network device.

2. Description of the Related Art

An optical transmitter and/or receiver such as a small form factor pluggable (SFP) optical transceiver includes a housing with appropriate electrical circuitry that interfaces with other optical communications equipment. The front face of the housing includes a receptacle for receiving a fiber optic connector to which an optical fiber cable is terminated. The optical transmitter and receiver are interconnected by the optical fiber cable.

SFP optical transceivers are useful in improving the configurability of products by allowing transceivers to be swapped as needed to reconfigure the given ports for the needed link range and media type. The SFP standard prescribes a single prong retaining mechanism to fix the SFP optical transceiver in a cage that is mounted on a printed circuit board (PCB) of a network device such as a switch or a router. This single prong retaining mechanism is not durable enough to stand up to heavy shock and vibration environments, greatly limiting the use of SFP optical transceivers in such environments.

Current solutions for fixing SFP optical transceivers in place have been limited to use of glue to permanently fix the SFP optical transceiver in place. However, this approach greatly limits the flexibility offered by SFP optical transceivers because it eliminates the easy swapping and reconfigurability of switch/router platforms. In addition, it forces an entire module to be removed should a single SFP optical transceiver fail.

Therefore, there is a need for improvements to fixing SFP optical transceivers in place, such as improvements in mounting systems of SFP optical transceivers in networking applications like switch/router platforms.

SUMMARY

Briefly described, aspects of the present invention relate to a locking plug mechanism that provides a retaining feature for fixing SFP optical transceivers in place when they engage with a network device. In particular, a small form factor pluggable (SFP) optical transceiver module is provided with a locking plug mechanism having a male connector and a female connector which engage with each other to removably retain a SFP optical transceiver with a faceplate of a network device such as a switch or a router. In this way, instead of permanently fixing the SFP optical transceiver in place flexibility is offered by the SFP optical transceiver for easy swapping and reconfigurability of switch/router platforms. One of ordinary skill in the art appreciates that such a SFP optical transceiver module can be configured to be installed in different environments where such reconfiguring is needed, for example, in networking applications.

In accordance with one illustrative embodiment of the present invention, a small form factor pluggable (SFP) optical transceiver module is provided. It includes a shell assembly that encloses an optical fiber connector configured to connect to a SFP optical transceiver and a retaining mount that is configured to be attached to a body portion of a device housing of a network device. The SFP optical transceiver is configured to interface a network device motherboard to a fiber optic at a given port of the network device and is a hot-pluggable transceiver being used for at least one of telecommunication and data communications. The shell assembly is configured to removably latch onto the retaining mount. The shell assembly includes a base and a body coupled to each other. The body has a latch to securely attach the optical fiber connector and the SFP optical transceiver to the retaining mount while allowing the SFP optical transceiver to be swapped as needed to reconfigure the given port of the network device.

In accordance with another illustrative embodiment of the present invention, a small form factor pluggable (SFP) optical transceiver module is provided. It comprises a prong retaining mechanism and a retaining plug mechanism. The prong retaining mechanism is configured to removably mount a SFP optical transceiver at a given port of a network device in a cage mounted on a printed circuit board (PCB) of the network device. The retaining plug mechanism is configured to removably mount the SFP optical transceiver and an optical fiber connector configured to connect to the SFP optical transceiver to the cage.

In accordance with yet another illustrative embodiment of the present invention, a method of providing optical communications is provided. The method includes providing an optical fiber connector configured to be secured to a small form factor pluggable (SFP) optical transceiver, providing a retaining mount that is configured to be attached to a body portion of a device housing of a network device and enclosing the optical fiber connector with a shell assembly. The shell assembly is configured to removably latch onto the retaining mount. The shell assembly includes a base and a body coupled to each other. The body has a latch to securely attach the SFP optical transceiver to the retaining mount while allowing the SFP optical transceiver to be swapped as needed to reconfigure the given port of the network device.

BRIEF DESCRIPTION OF THE DRAWINGS

FIG. 1A illustrates a perspective view of a small form factor pluggable (SFP) optical transceiver module usable with a SFP optical transceiver in accordance with one illustrative embodiment of the present invention.

FIG. 4 illustrates a schematic diagram of another small form factor pluggable (SFP) optical communications system in accordance with another illustrative embodiment of the present invention.

FIG. 5 illustrates a perspective view of yet another small form factor pluggable (SFP) optical transceiver module usable with a SFP optical transceiver in accordance with yet another illustrative embodiment of the present invention.

FIG. 6 illustrates a flow chart of a method of providing optical communications in accordance with an exemplary embodiment of the present invention.

DETAILED DESCRIPTION

Figure 1B:
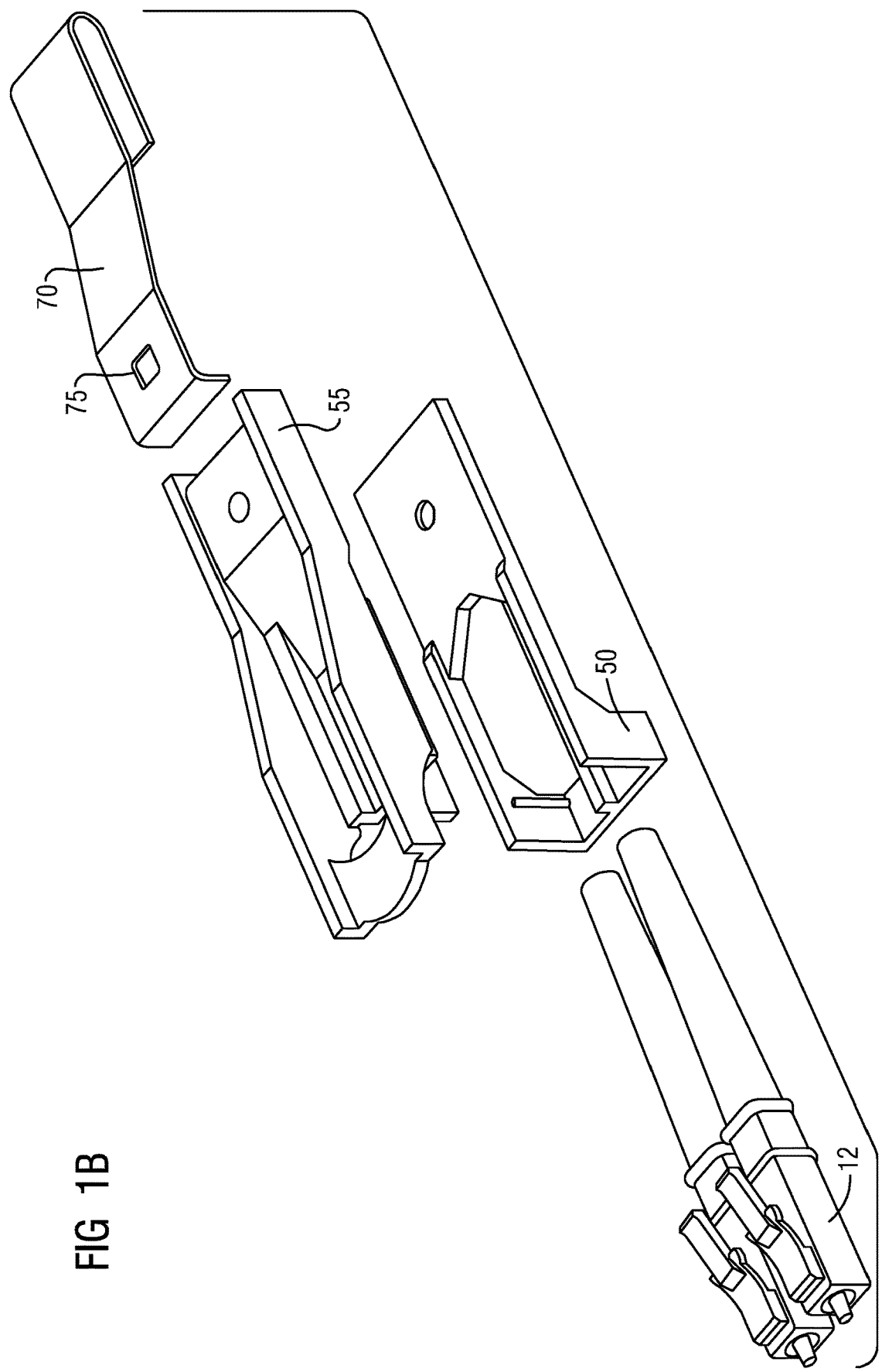
FIG. 1B illustrates an exploded view of the small form factor pluggable (SFP) optical transceiver module of FIG. 1A in accordance with one illustrative embodiment of the present invention.

To facilitate an understanding of embodiments, principles, and features of the present invention, they are explained hereinafter with reference to implementation in illustrative embodiments. In particular, they are described in the context of securely attaching an optical fiber connector and a SFP optical transceiver to a retaining mount attached to a body portion of a device housing of a network device by inserting a portion of a body of a shell assembly enclosing the optical fiber connector into the retaining mount. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

A small form factor pluggable (SFP) optical transceiver module is provided for use in a SFP optical communications system to removably retain a SFP optical transceiver on a faceplate or a body of a network device to flexibly configure a given port of the network device. A separate retaining mount of the SFP optical transceiver module may be attached to the network device faceplate/body or an integrated retaining feature such as a slot on the faceplate/body of the network device may be used. For example, the retaining mount may be a retaining sleeve that can be a separate component or an integral feature of the faceplate. The retaining sleeve includes a retaining feature which may be a hook that is attached to the network device. However, this retaining feature can be a slot on the faceplate as well, with the hook being built into a spring tab of a shell assembly and attaching into a specific retaining feature on the faceplate.

Accordingly, a locking system is provided for a SFP optical transceiver being used by a SFP optical communications system. In one embodiment, a SFP optical transceiver is inserted into a cage and a LC connector is enclosed in a shell assembly defining a plug or a collar of a SFP optical transceiver module. This plug of the shell assembly is configured to be inserted into a retaining sleeve and is hooked in place by way of a spring tab that is integrated into the shell assembly. This solution ensures locking of the SFP optical transceiver is durable enough to stand up to heavy shock and vibration environments.

FIG. 1A illustrates a perspective view of a small form factor pluggable (SFP) optical transceiver module 5 usable with a SFP optical transceiver (not shown) in accordance with one illustrative embodiment of the present invention. The SFP optical transceiver module 5 may be made of a metal, plastic, polycarbonate or other suitable material. Examples of the metal include steel, aluminum, alloys etc.

As used herein, the "SFP optical transceiver module" refers to a retainer of a SFP optical transceiver on a faceplate or a body of a network device to flexibly configure a given port of the network device. Examples of the network device include a switch, a router or a media converter. The "SFP optical transceiver module," in addition to the exemplary hardware description below, refers to a device that is configured to lock in-place the SFP optical transceiver. The "SFP optical transceiver module," may be capable of allowing the SFP optical transceiver to be swapped as needed to reconfigure the given port of the network device.

FIG. 1B illustrates an exploded view of the small form factor pluggable (SFP) optical transceiver module 5 of FIG. 1 in accordance with one illustrative embodiment of the present invention. The SFP optical transceiver module 5 comprises a shell assembly 10 that is configured to enclose an optical fiber connector 12 configured to connect to the SFP optical transceiver. The SFP optical transceiver is configured to interface a network device motherboard to a fiber optic at a given port of the network device and is a hot-pluggable transceiver being used for at least one of telecommunication and data communications. A person skilled in the pertinent art would appreciate that other suitable SFP transceivers may be readily deployed based on a specific implementation without departing from the scope of the present invention.

Referring to FIG. 1A, the SFP optical transceiver module 5 further includes a retaining mount 15 that is configured to be attached to a body portion of a device housing of the network device. The body portion may be a faceplate of the device housing. The retaining mount 15 may be attached to the body portion of the device housing with a fastening means including a screw and a nut, a rivet, adhesive epoxy etc. Other suitable fastening means may be utilized to hold together the retaining mount 15 with the faceplate. The faceplate may be made of a metal such as steel. The fastening means may be made of the metal.

The retaining mount 15 may include a retaining feature having a top 20 and a bottom 25 which together define a recess 30. The top 20 includes a projection 35 that extends beyond a distal end of the bottom 25. In the top 20, a hook 40 is built-in at a distal end of the projection 35 to inset into a corresponding mating structure of the shell assembly 10. In one embodiment, the retaining mount 15 is a sleeve.

The shell assembly 10 is configured to removably latch onto the retaining mount 15. To this end, the shell assembly 10 includes a base 50 and a body 55 coupled to each other. The body 55 defines a plug or a collar 60 to insert into the recess 30 of the retaining mount. The body 55 includes a latch 65 (e.g., a combination of the hook 40 and an opposing hole or slot (not seen in FIG. 1A) as a mating feature built into the body 55) to securely attach the optical fiber connector and the SFP optical transceiver to the retaining mount 15 while allowing the SFP optical transceiver to be swapped as needed to reconfigure the given port of the network device.

Referring to FIG. 1B, in one embodiment, the latch 65 of the shell assembly 10 is a spring tab 70 that is integrated into the shell assembly 10. The spring tab 70 includes a hole or a slot 75 to frictionally or engagedly receive the hook 40 of the retaining mount 15 to removably retain, attach or fix the SFP optical transceiver to a body portion of a device housing of the network device.

Alternate locking or attachment mechanisms include a bi-directional clip latching onto formed grooves from opposite sides. Otherwise, hooks on a tab that pass through the faceplate via narrow slits and hook on may be used. Pressing the tab may unhook the plug.

While particular embodiments are described in terms of the SFP optical transceiver module 5 as a SFP optical transceiver, the techniques described herein are not limited to SFP optical transceiver but can be also used with SFP transceivers, such as different types of non-optical SFP transceivers could be deployed.

Consistent with one embodiment, the shell assembly 10 is configured to retain both the optical fiber connector and the SFP optical transceiver in a SFP receptacle (see FIG. 2) of the network device. For example, the SFP receptacle is a cage mounted on a printed circuit board (PCB) of the network device. In one embodiment, a prong retaining mechanism may be configured to removably mount the SFP optical transceiver in the cage (see FIG. 2). After the SFP optical transceiver has been inserted into a housing of the cage, a latch element of a latching mechanism engages a latch locking mechanism (not shown) located on the cage housing to lock the SFP optical transceiver to the cage housing. In this manner, the SFP optical transceiver is secured to the cage.

In small form factor pluggable (SFP) optical communications systems, an optical fiber cable having a transmit optical fiber and an optical fiber cable having a receive optical fiber are terminated on their ends with a duplex connector that plugs into a duplex receptacle of the SFP housing. The duplex receptacle is secured to the housing of the duplex SFP system. The housing of the duplex SFP system is typically configured to be inserted into a cage. The housing includes an optics system, two active optical elements (i.e., a light source and a light detector), and electrical circuitry.

Currently, there are two types of SFP optical transceivers that are prevalent in the market, namely, systems that use LC connectors and systems that use MTRJ connectors. The most commonly used connector is the LC connector.

In SFP systems that use LC connectors, a duplex LC connector terminates the ends two optical fiber cables, one of which has a transmit fiber and the other of which has a receive fiber. The system housing has a duplex LC receptacle that is configured to receive the duplex LC connector and to lock the connector in the duplex receptacle in optical alignment with the optics system of the SFP system housing.

Figure 2:
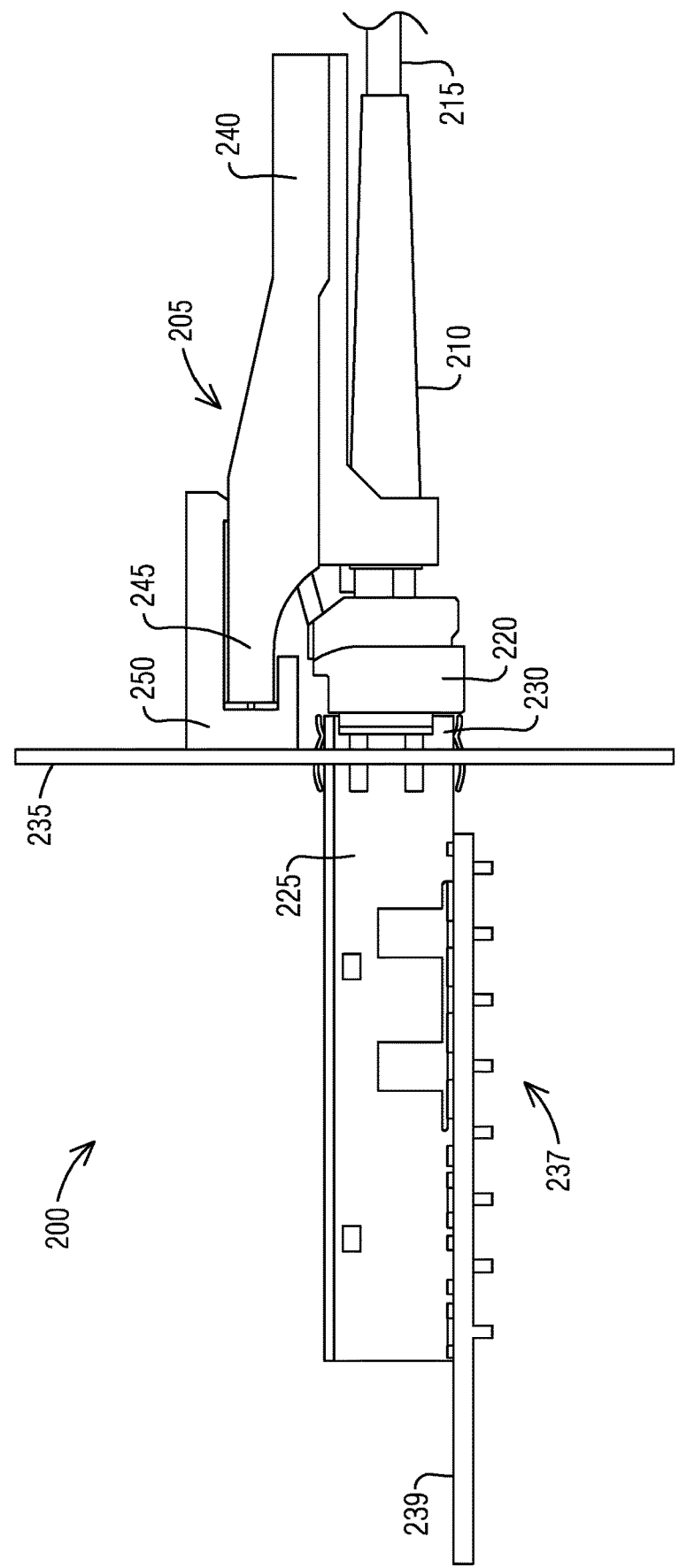
FIG. 2 illustrates a schematic diagram of a small form factor pluggable (SFP) optical communications system in accordance with one illustrative embodiment of the present invention.

Referring to FIG. 2, it illustrates a schematic diagram of a small form factor pluggable (SFP) optical communications system 200 in accordance with one illustrative embodiment of the present invention. The SFP optical communications system 200 includes a SFP optical transceiver module 205 configured to be engaged on an optical fiber connector 210 coupled to a fiber optic 215. The SFP optical communications system 200 includes a SFP optical transceiver 220 attached to the optical fiber connector 210.

The SFP optical transceiver 220 houses an optical transmitter and an optical receiver, which are not shown in FIG. 1A for ease of illustration. As is known in the art, the optical transmitter generally comprises components for generating an optical signal (e.g., a light source, such as a light-emitting diode (LED) or laser diode), and one or more optics elements for directing the light into the end of a transmit optical fiber. The optical receiver generally comprises the components for receiving an optical signal (e.g., a photo-detector or photo-sensor, such as a photodiode), and one or more optics elements for directing light output from the end of a receive optical fiber onto the photo-detector or photo-sensor.

The SFP optical transceiver 220 may be "pluggable." The term "pluggable," as is used herein, means that the SFP optical transceiver 220 can be plugged into and unplugged from a mating receptacle (not shown) of the SFP optical communications system 200.

The SFP optical transceiver module 205 is configured to enclose the optical fiber connector 210. The optical fiber connector 210 may be a duplex LC connector terminates the ends two optical fiber cables of the fiber optic 215.

The SFP optical transceiver 220 may be fixed to a housing 225 of a cage 230 attached to a faceplate 235 of a network device 237. The cage 230 may be mounted on a PCB 239. The cage 230 may comprise an electrical assembly (not seen) which includes at least one active optical receiver element, such as a photodiode, for example, and at least one active optical transmitter element, such as a laser diode or LED, for example.

Additionally, the electrical assembly typically also includes one or more transmitter and receiver integrated circuits (ICs). For example, the electrical assembly typically also includes a driver IC for driving the LED or laser diode, a receiver IC for processing the electrical signals produced by the receiver photodiode, and a controller IC for controlling the transmitter and receiver operations. For ease of illustration, the components of the electrical assembly are not shown in FIG. 2.

The optical fiber connector 210 being a duplex LC connector is enclosed in a shell assembly 240 defining a plug or a collar 245 of the SFP optical transceiver module 220. This plug 245 of the shell assembly 240 is configured to be inserted into a retaining sleeve 250 and is hooked in place by way of a spring tab (not seen) that is integrated into the shell assembly 240.

In another embodiment, a duplex small form factor pluggable (SFP) optical transceiver module may include a duplicated mechanism of latching. Double and opposite in-place locking of a SFP optical transceiver may generally provide relatively sturdier connection as stress forces gets distributed across two attachment links.

Figure 3:
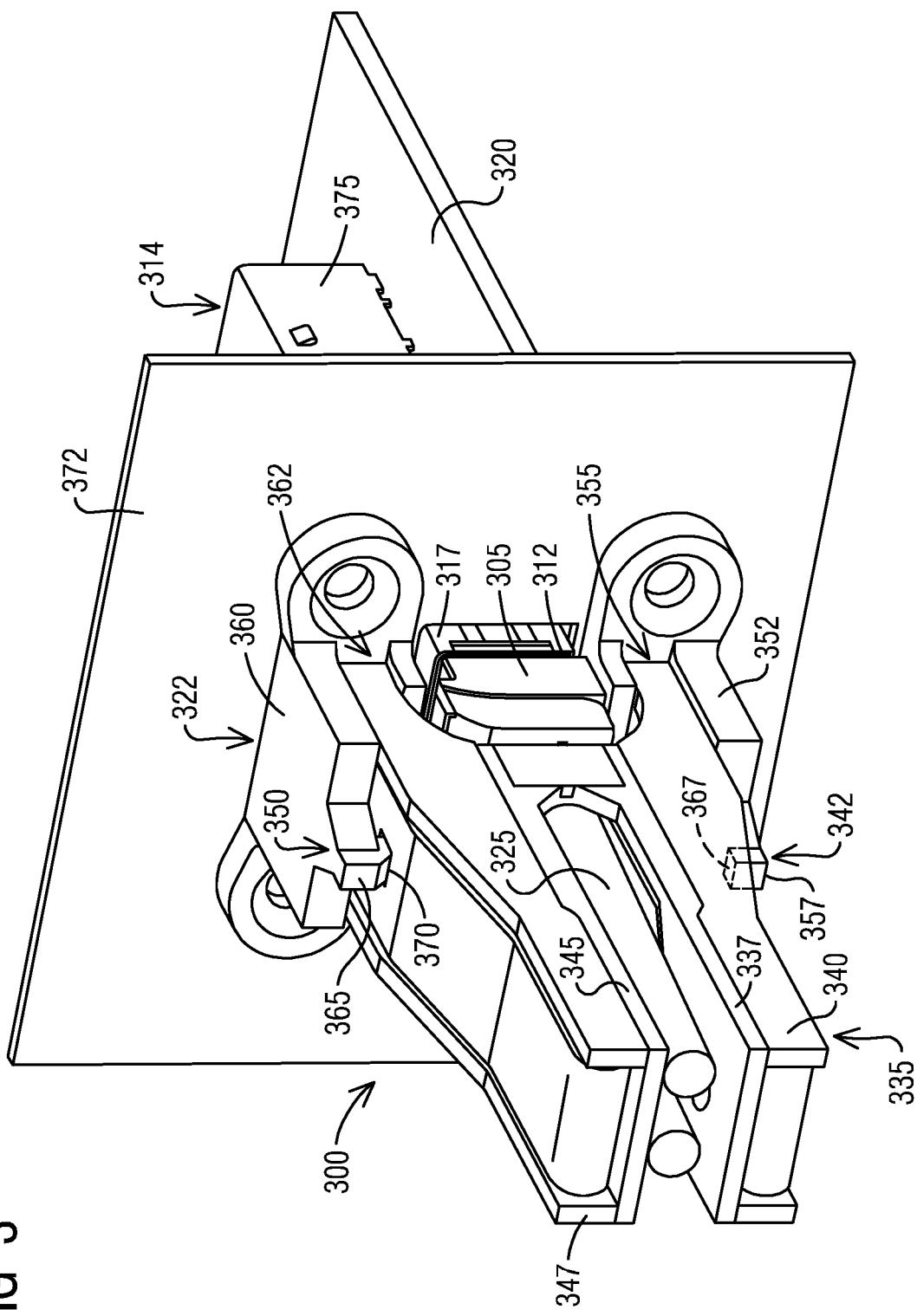
FIG. 3 illustrates a perspective view of another small form factor pluggable (SFP) optical transceiver module usable with a SFP optical transceiver in accordance with another illustrative embodiment of the present invention.

Turning now to FIG. 3, it illustrates a perspective view of a duplex small form factor pluggable (SFP) optical transceiver module 300 usable with a SFP optical transceiver 305 in accordance with another illustrative embodiment of the present invention. The duplex SFP optical transceiver module 300 comprises a duplicated latching mechanism along with a standard existing prong latching mechanism.

In particular, the duplex SFP optical transceiver module 300 comprises a prong retaining mechanism 312 configured to removably mount the SFP optical transceiver 305 at a given port of a network device 314 in a cage 317 mounted on a printed circuit board (PCB) 320 of the network device 314. The duplex SFP optical transceiver module 300 further comprises a retaining plug mechanism 322 configured to removably mount the SFP optical transceiver 305 and an optical fiber connector 325 configured to connect to the SFP optical transceiver 305 to the cage 317.

The retaining plug mechanism 322 further comprises a shell assembly 335 that encloses the optical fiber connector 325. The shell assembly 335 may include a first base 337, a first body 340 having a first latching mechanism 342 to couple the SFP optical transceiver 305 and the optical fiber connector 325 to the network device 314. The shell assembly 335 may further include a second base 345, a second body 347 having a second latching mechanism 350 to couple the SFP optical transceiver 305 and the optical fiber connector 325 to the network device 314.

The retaining plug mechanism 322 comprises a first retaining mount 352. The first retaining mount 352 may be a first sleeve 355 having a first hook 357. The retaining plug mechanism 322 further comprises a second retaining mount 360. The second retaining mount 360 may be a second sleeve 362 having a second hook 365. The first latching mechanism 342 of the first body 340 may be a first slot 367 configured to releasably engage with the first hook 357. The second latching mechanism 350 of the second body 347 may be a second slot 370 configured to releasably engage with the second hook 365.

In this way, the first body 340 having the first latching mechanism 342 may couple to the first retaining mount 352. Similarly, the second body 347 having the second latching mechanism 350 may couple to the second retaining mount 360.

The first body 340 may attach to a body portion 372 of a device housing 375 of the network device 314 to couple the SFP optical transceiver 305 and the optical fiber connector 325 to the network device 314. The second body 347 may attach to the body portion 372 of the device housing 375 of the network device 314 to couple the SFP optical transceiver 305 and the optical fiber connector 325 to the network device 314. The SFP optical transceiver 305 may be configured to interface a network device motherboard to a fiber optic and is a hot-pluggable transceiver being used for at least one of telecommunication and data communications.

The shell assembly 335 may be configured to latch onto the first and second retaining mounts 352, 360 that are a separate component attached to the body portion 372 of the device housing 375 of the network device 314 or an integral feature of the body portion 372 of the device housing 375 of the network device 314. The integral feature of the body portion 372 of the device housing 375 of the network device 314 may be a slot in a faceplate of the network device 314. The shell assembly 335 may include a pair of base and a body coupled to each other where the body has a spring tab with a hook to attach into the slot of the faceplate.

Accordingly, a latch may securely attach the optical fiber connector 325 and the SFP optical transceiver 305 to the first and second retaining mounts 352, 360 while allowing the SFP optical transceiver 305 to be swapped as needed to reconfigure a given port of the network device 314. Similar to as shown in FIGS. 1A and 1B, a first latch may include a first spring tab with a first hole and the first retaining mount 352 having a first hook to engage in the first hole of the first spring tab to releasably engage the first spring tab to the first hook of the first retaining mount 352. Likewise, a second latch may include a second spring tab with a second hole and the second retaining mount 360 having a second hook to engage in the second hole of the second spring tab to releasably engage the second spring tab to the second hook of the second retaining mount 360.

In FIG. 4, a schematic diagram of a duplex small form factor pluggable (SFP) optical communications system 400 is illustrated in accordance with another exemplary embodiment of the present invention. The duplex SFP optical communications system 400 includes a duplicated mechanism of latching. The duplex SFP optical communications system 400 provides a double and opposite in-place locking of a SFP optical transceiver. The duplex SFP optical communications system 400 may generally provide relatively sturdier connection as stress forces gets distributed across two attachment links.

In yet another embodiment, a small form factor pluggable (SFP) optical transceiver module may include a reverse mechanism of latching. In this configuration, a hook is provided on a plug instead of on a retaining mount. For some situations having very specific constraints, this embodiment may be more suitable for use.

FIG. 5 illustrates a perspective view of a reverse small form factor pluggable (SFP) optical transceiver module 500 usable with a SFP optical transceiver 505 in accordance with yet another illustrative embodiment of the present invention. In the reverse SFP optical transceiver module 500, a plug 510 envelopes a retaining collar 515. A hook (not seen) is provided on the plug 510 instead of on the retaining collar 515. A hole or a slot (not seen) is provided on the retaining collar 515 instead of on the plug 510. The hook and the hole or slot may be similar to one illustrated with respect to other embodiments above.

Referring to FIG. 6, it illustrates a flow chart of a method 600 of providing optical communications in accordance with an exemplary embodiment of the present invention. Reference is made to the elements and features described in FIGS. 1-5. It should be appreciated that some steps are not required to be performed in any particular order, and that some steps are optional.

In step 605, the method 600 of providing optical communications includes providing the optical fiber connector 210 configured to be secured to the small form factor pluggable (SFP) optical transceiver 220. In step 610, the retaining mount 15 that is configured to be attached to a body portion such as the faceplate 235 of a device housing of the network device 237 is provided.

As shown in step 615, the optical fiber connector 210 may be enclosed with the shell assembly 240. The shell assembly 240 may be configured to removably latch onto the retaining mount 15. The shell assembly 240 may include a base and a body coupled to each other. The body has a latch to securely attach the SFP optical transceiver 220 to the retaining mount 15 while allowing the SFP optical transceiver 220 to be swapped as needed to reconfigure the given port of the network device 237.

Figure 7:
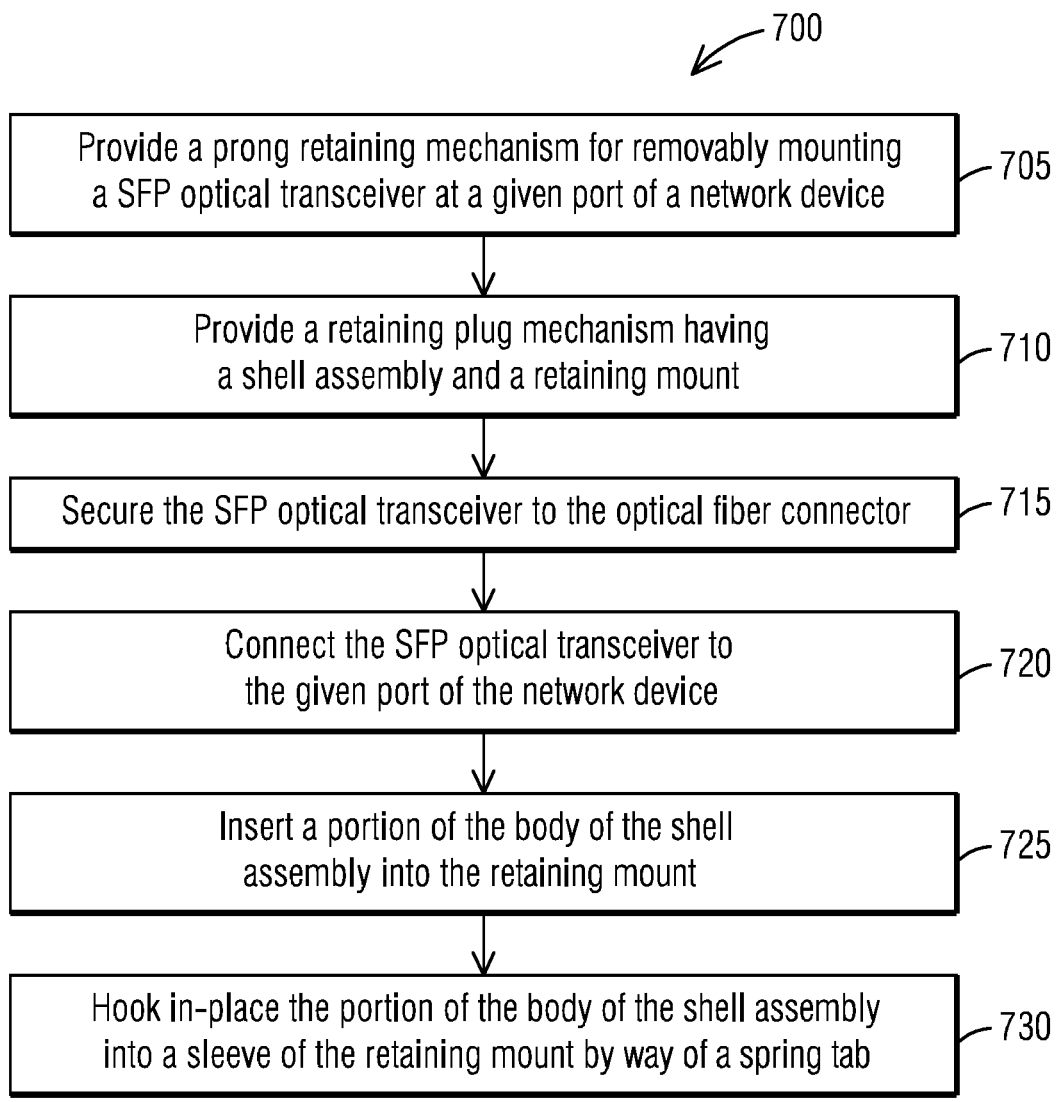
FIG. 7 illustrates a flow chart of a method of removably mounting a SFP transceiver in accordance with an exemplary embodiment of the present invention.

FIG. 7 illustrates a flow chart of a method 700 of removably mounting the SFP optical transceiver 220 in accordance with an exemplary embodiment of the present invention. Reference is made to the elements and features described in FIGS. 1-5. It should be appreciated that some steps are not required to be performed in any particular order, and that some steps are optional.

In step 705, the method 700 includes providing a prong retaining mechanism for removably mounting the SFP optical transceiver 220 at a given port of the network device 237 in the cage 230 mounted on a printed circuit board (PCB) of the network device 237. In step 710, the method 700 further includes providing a retaining plug mechanism for removably mounting the SFP optical transceiver 220 and the optical fiber connector 210 configured to connect to the SFP optical transceiver 220 to the cage 230.

At step 715, the SFP optical transceiver 220 may be secured to the optical fiber connector 210. The SFP optical transceiver 220 then be connected at the given port of the network device 237 at step 720.

At step 725, connecting the SFP optical transceiver 220 includes securely attaching the optical fiber connector 210 and the SFP optical transceiver 220 to the retaining mount 15 by inserting a portion of the body of the shell assembly 240 into the retaining mount 15. This secure attachment may be done by hooking in place the portion of the body of the shell assembly 240 into a sleeve of the retaining mount 15 by way of a spring tab that is integrated into the shell assembly 240, as shown in step 730.

Embodiments of the present invention will ensure in-place locking of a SFP optical transceiver or a SFP non-optical transceiver with a faceplate of a network device in a relatively durable manner which is capable of withstanding heavy shocks and a vibration environment. Network infrastructure owners would also experience greater reliability, decreased maintenance costs, and higher operational availability on their networks. With known installation methods, the embodiments of the present invention may provide a retrofit solution, requiring no removal of installed network infrastructure.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A small form factor pluggable (SFP) optical transceiver module comprising:
   an optical fiber connector;
   a shell assembly that encloses the optical fiber connector configured to connect to a SFP optical transceiver, the SFP optical transceiver is configured to interface a network device motherboard to a fiber optic at a given port of a network device and is a hot-pluggable transceiver being used for at least one of telecommunication and data communications; and
   a retaining mount that is configured to be attached to a body portion of a device housing of the network device,
   wherein the shell assembly is configured to removably latch onto the retaining mount,
   wherein the shell assembly includes a base and a body coupled to each other, and
   wherein the body having a latch to securely attach the optical fiber connector and the SFP optical transceiver to the retaining mount while allowing the SFP optical transceiver to be swapped as needed to reconfigure the given port of the network device, wherein the latch of the shell assembly is a spring tab that is integrated into the shell assembly.

2. The SFP optical transceiver module of claim 1, wherein the shell assembly is configured to retain both the optical fiber connector and the SFP optical transceiver in a SFP receptacle.

3. The SFP optical transceiver module of claim 2, wherein the SFP receptacle is a cage mounted on a printed circuit board (PCB).

4. The SFP optical transceiver module of claim 3, further comprising:
   a prong retaining mechanism configured to removably mount the SFP optical transceiver in the cage.

5. The SFP optical transceiver module of claim 1, wherein the retaining mount is a sleeve.

6. The SFP optical transceiver module of claim 1, wherein the body portion of the device housing of the network device is a faceplate of a switch, a router, or a media converter.

7. The SFP optical transceiver module of claim 5, wherein the sleeve has a hook and the spring tab has a slot or a hole configured to releasably engage with the hook.

8. The SFP optical transceiver module of claim 1, wherein the shell assembly includes a first body having a first latching mechanism to couple the SFP optical transceiver and the optical fiber connector to the network device and a second body having a second latching mechanism to couple the SFP optical transceiver and the optical fiber connector to the network device.

9. The SFP optical transceiver module of claim 1, wherein the retaining mount is an integral feature of the body portion of the device housing of the network device, in particular a slot in a faceplate of the network device and the spring tab comprises a hook to attach into the slot of the faceplate.

10. A method of providing optical communications via a small form factor pluggable (SFP) optical transceiver module, the method comprising:
    providing an optical fiber connector;
    providing a shell assembly that encloses the optical fiber connector configured to connect to a SFP optical transceiver, the SFP optical transceiver is configured to interface a network device motherboard to a fiber optic at a given port of a network device and is a hot-pluggable transceiver being used for at least one of telecommunication and data communications; and
    providing a retaining mount that is configured to be attached to a body portion of a device housing of the network device,
    wherein the shell assembly is configured to removably latch onto the retaining mount,
    wherein the shell assembly includes a base and a body coupled to each other, and
    wherein the body having a latch to securely attach the optical fiber connector and the SFP optical transceiver to the retaining mount while allowing the SFP optical transceiver to be swapped as needed to reconfigure the given port of the network device, wherein the latch of the shell assembly is a spring tab that is integrated into the shell assembly.

11. The method of claim 10, wherein the shell assembly is configured to retain both the optical fiber connector and the SFP optical transceiver in a SFP receptacle.

12. The method of claim 11, wherein the SFP receptacle is a cage mounted on a printed circuit board (PCB).

13. The method of claim 12, further comprising:
    providing a prong retaining mechanism configured to removably mount the SFP optical transceiver in the cage.

14. The method of claim 10, wherein the retaining mount is a sleeve.

15. The method of claim 10, wherein the body portion of the device housing of the network device is a faceplate of a switch, a router, or a media converter.

16. The method of claim 14, wherein the sleeve has a hook and the spring tab has a slot or a hole configured to releasably engage with the hook.

17. The method of claim 10, wherein the shell assembly includes a first body having a first latching mechanism to couple the SFP optical transceiver and the optical fiber connector to the network device and a second body having a second latching mechanism to couple the SFP optical transceiver and the optical fiber connector to the network device.

18. The method of claim 10, wherein the retaining mount is an integral feature of the body portion of the device housing of the network device, in particular a slot in a faceplate of the network device and the spring tab comprises a hook to attach into the slot of the faceplate.

* * * * *